A. A. PORTER.
Improvement in Handles for Garden Implements.
No. 115,352.  Patented May 30, 1871.
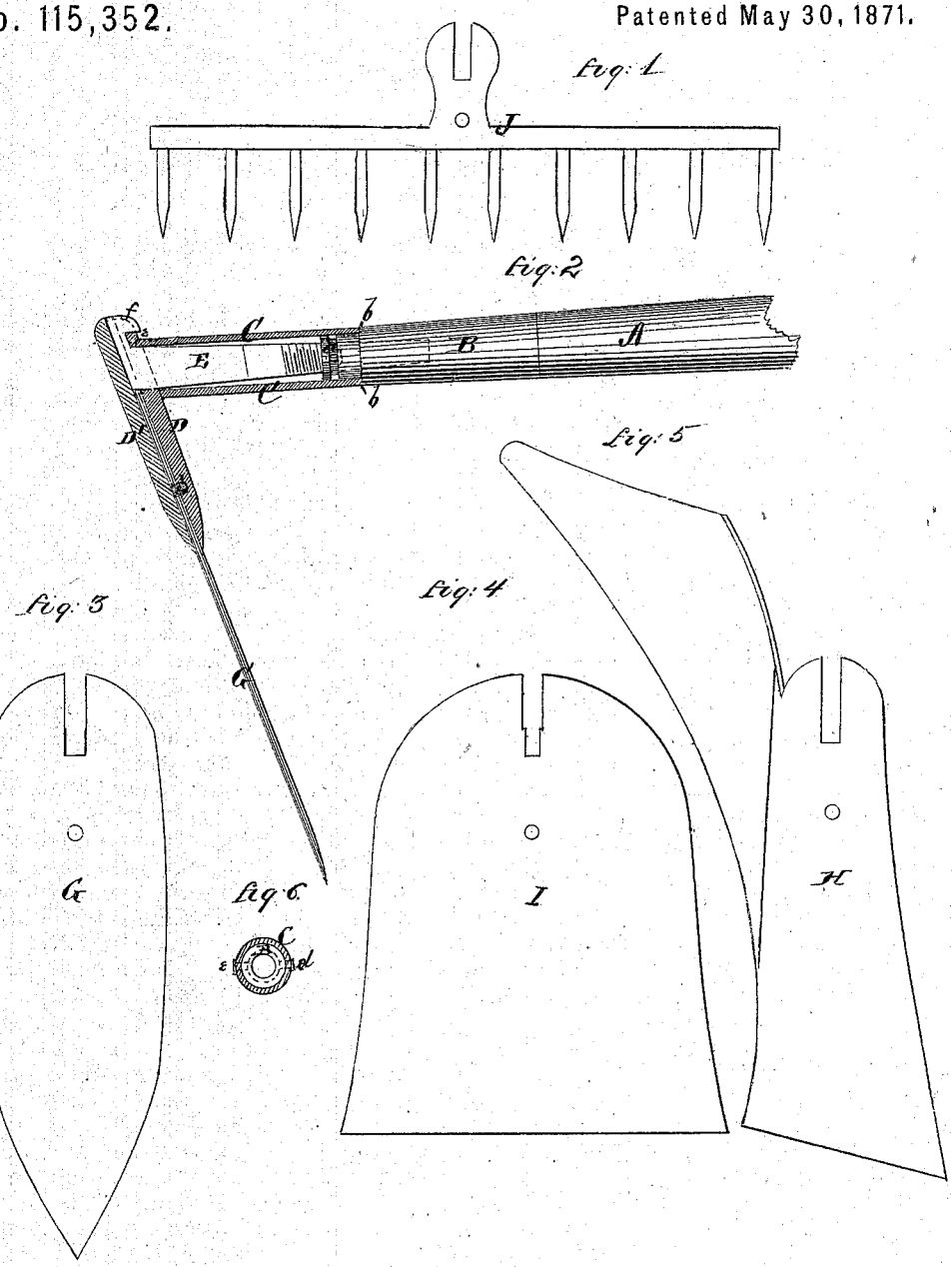
Witnesses.
C. L. Evers
Jas. E. Hutchinson
Inventor.
Archibald A. Porter.
per Alexander Mason
Atty.

UNITED STATES PATENT OFFICE.

ARCHIBALD A. PORTER, OF GRIFFIN, GEORGIA, ASSIGNOR OF ONE-HALF HIS RIGHT TO JOHN E. MOSS AND JOHN M. WILLIAMS, OF SAME PLACE.

IMPROVEMENT IN HANDLES FOR GARDEN IMPLEMENTS.

Specification forming part of Letters Patent No. 115,352, dated May 30, 1871.

*To all whom it may concern:*

Be it known that I, ARCHIBALD A. PORTER, of Griffin, in the county of Spaulding and in the State of Georgia, have invented certain new and useful Improvements in Combined Garden Implement; and do hereby declare that the following is a full, clear, and exact description thereof, reference being had to the accompanying drawing and to the letters of reference marked thereon making a part of this specification.

The nature of my invention consists in the construction and arrangement of a handle or holder for various garden implements, as will be hereinafter more fully set forth.

In order to enable others skilled in the art to which my invention appertains to make and use the same, I will now proceed to describe its construction and operation, referring to the annexed drawing, in which—

Figure 2 is a longitudinal section of the holder, showing a narrow plow held therein; Fig. 6 is a transverse section of the same; and Figs. 1, 3, 4, and 5 are views of a few of the various implements which may be used with my holder.

A represents the handle, one end of which is inserted into and fastened in a socket, B. The front end of this socket is also hollow, and provided with screw-threads on the inside. On the outside, near the front end, is a circumferential groove, $a$, as shown in Fig. 2; and in rear thereof is formed a shoulder, $b$. On the front end of the socket B is placed a tube, C, resting against the shoulder $b$, so as to form, as it were, a continuation of the socket B. This tube is fastened by two small set-screws, $d$ $d$, which pass into the groove $a$, thus preventing the tube from coming off, but at the same time allowing the tube to turn on the front end of the socket. On the front end of the tube C is secured the jaw, D, which is so constructed as to leave a rectangular opening into the tube. The lower end of this jaw is inclined backward, and extends downward for a suitable distance, while the upper part extends only far enough above the tube to allow of the formation of a notch, $e$. The other jaw D' is attached in a similar slanting or inclined position to a screw, E, the end of which, nearest the jaw, is made flat so as to fit and pass through the rectangular opening to the tube C without turning. On the upper side of this screw, at the upper edge of the jaw D', is formed a hook or projection, $f$, which fits in the notch $e$ on the jaw D. On the rear side of the jaw D', near the lower end, is a pin, $i$, which is to pass through the implement and into a hole in the jaw D. G represents a narrow plow; H, a turn-plow; I, a hoe; and J, a rake, to be used with my holder. These are only a few of the implements which may be inserted and held therein; but all of said implements should have a slot to fit around the flat portion of the screw E and a hole for the pin $i$ to pass through.

By turning the handle A to the left, the screw E, of course, will be moved outward, separating the jaw D' from the stationary jaw D. The implement is then inserted between them in proper position, and the handle turned to the right, which clamps the implement firmly between the two jaws D D', the projection $f$ passing through the upper portion of the slot in the implement and into the notch $e$, while the pin $i$ passes through the hole in the implement and into the stationary jaw.

Having thus fully described my invention, what I claim as new, and desire to secure by Letters Patent, is—

The combination of the handle A provided at its forward end with a female screw and outer circumferential groove $a$, the tube C provided with the stationary jaw D, having notch $e$, and held by the screws $d$ $d$, with the jaw D', with screw E, hook $f$, and pin $i$, all substantially as and for the purposes set forth.

In testimony that I claim the foregoing I have hereunto set my hand this 31st day of March, 1871.

ARCHIBALD A. PORTER.

Witnesses:
M. J. LUNQUEST,
THOS. W. THURMAN.